(12) United States Patent
Wang et al.

(10) Patent No.: US 11,579,494 B2
(45) Date of Patent: Feb. 14, 2023

(54) SWITCHABLE GLASS PANEL, METHOD OF FORMING SWITCHABLE GLASS PANEL AND METHOD OF FORMING SWITCHABLE GLASS

(71) Applicants: Beijing BOE Sensor Technology Co., Ltd., Beijing (CN); BOE Technology Group Co., Ltd., Beijing (CN)

(72) Inventors: Ying Wang, Beijing (CN); Zhan Li, Beijing (CN); Sikai Zhang, Beijing (CN); Juan Chen, Beijing (CN); Changyin Wang, Beijing (CN); Peng Liang, Beijing (CN); Deshen Zhai, Beijing (CN); Chunlei Wang, Beijing (CN); Yue Shi, Beijing (CN); Chuncheng Che, Beijing (CN); Feng Liu, Beijing (CN); Hao Liu, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/536,835

(22) Filed: Nov. 29, 2021

(65) Prior Publication Data
US 2022/0299805 A1 Sep. 22, 2022

(30) Foreign Application Priority Data
Mar. 17, 2021 (CN) .......................... 202110285716.0

(51) Int. Cl.
*G02F 1/1339* (2006.01)
*G02F 1/1333* (2006.01)
(Continued)

(52) U.S. Cl.
CPC ........ *G02F 1/1339* (2013.01); *G02F 1/13439* (2013.01); *G02F 1/133302* (2021.01);
(Continued)

(58) Field of Classification Search
CPC .......................... G02F 1/1339; G02F 1/133377
See application file for complete search history.

(56) References Cited

U.S. PATENT DOCUMENTS 5,771,084 A * 6/1998 Fujimori ............... G02F 1/1339
349/89
2016/0291401 A1 * 10/2016 Cheng ................... G02F 1/1341
(Continued)

FOREIGN PATENT DOCUMENTS

| CN | 104375334 A | 2/2015 |
| CN | 104391401 A | 3/2015 |

(Continued)

OTHER PUBLICATIONS

CN 202110285716.0 first office action.

*Primary Examiner* — Jessica M Merlin
(74) *Attorney, Agent, or Firm* — IPro, PLLC (57) ABSTRACT

A switchable glass panel, a method of forming switchable glass panel and a method of forming switchable glass are provided. The method includes: forming a first electrode layer and a first alignment layer sequentially on a first substrate, and forming a second electrode layer and a second alignment layer sequentially on a second substrate; forming first sealants distributed along a first direction, second sealants distributed along a second direction and an edge sealant at the edge of the first alignment layer on the first alignment layer, where the first sealants and the second sealants form a grid with a plurality of openings; forming a plurality of liquid crystal layers corresponding to the plurality of openings on the second alignment layer; and oppositely arranging (Continued)

the first substrate and the second substrate to form a cell, and curing the first sealants and the second sealants.

18 Claims, 7 Drawing Sheets

(51) Int. Cl.
*G02F 1/1343* (2006.01)
*G02F 1/1337* (2006.01)
(52) U.S. Cl.
CPC .. *G02F 1/133377* (2013.01); *G02F 1/134309* (2013.01); *G02F 1/1337* (2013.01)

(56) References Cited

U.S. PATENT DOCUMENTS

| | | |
|---|---|---|
| 2016/0349552 A1 | 12/2016 | Shi et al. |
| 2021/0318567 A1 | 10/2021 | Wu |

FOREIGN PATENT DOCUMENTS

| | | |
|---|---|---|
| CN | 109541858 A | 3/2019 |
| CN | 111983866 A | 11/2020 |
| JP | 2007264525 A | 10/2007 |

\* cited by examiner

SWITCHABLE GLASS PANEL, METHOD OF FORMING SWITCHABLE GLASS PANEL AND METHOD OF FORMING SWITCHABLE GLASS

CROSS-REFERENCE TO RELATED APPLICATION

The present disclosure claims priority to Chinese Patent Application No. 202110285716.0 filed in China on Mar. 17, 2021, the present disclosure of which is hereby incorporated by reference in its entirely.

TECHNICAL FIELD

The present disclosure relates to the field of liquid crystal device technology. And more particularly, to a switchable glass panel, a method of forming switchable glass panel and a method of forming switchable glass.

BACKGROUND

The switchable glass is also called as atomized glass, electric control glass and intelligent dimming photochromic glass, and the light transmittance of the switchable glass can be changed by adjusting the input voltage. At present, the light-adjusting glass is widely applied to the fields of high-speed rail windows, automobile windows, building curtain walls and the like. The size and specification of the switchable glass required are correspondingly different according to the application field of the switchable glass.

In the related art, when the switchable glass with different sizes and different specifications is produced, the sealant process design needs to be correspondingly carried out on the glass substrate, so that when the switchable glass with various sizes and different specifications needs to be produced simultaneously, the sealant process design needs to be carried out for multiple times, and the method has great challenges in debugging production line equipment, design of the sealant process.

SUMMARY

A method of forming a switchable glass panel is provided in the present disclosure, including:

forming a first electrode layer and a first alignment layer sequentially on a first substrate, and forming a second electrode layer and a second alignment layer sequentially on a second substrate;

forming first sealants distributed along a first direction, second sealants distributed along a second direction and an edge sealant at the edge of the first alignment layer on the first alignment layer, where the first sealants and the second sealants form a grid with a plurality of openings;

forming a plurality of liquid crystal layers corresponding to the plurality of openings on the second alignment layer; and oppositely arranging the first substrate and the second substrate to form a cell, and curing the first sealants and the second sealants to form the switchable glass panel.

Optionally, the first sealants are arranged at equal intervals along the first direction, and the second sealants are arranged at equal intervals along the second direction.

Optionally, an interval between adjacent first sealants is equal to an interval between adjacent second sealants.

Optionally, an interval between adjacent first sealants in a central area of the first substrate with a set size is greater than an interval between adjacent first sealants in the other area of the first substrate, and an interval between adjacent second sealants in the central area of the first substrate with the set size is greater than an interval between adjacent second sealants in the other area of the first substrate.

Optionally, the first direction is orthogonal to the second direction.

Optionally, the first substrate has a rectangular shape, and the first direction and the second direction are respectively parallel to two adjacent sides of the rectangular shape.

Optionally, a width of each first sealant and a width of each second sealant are smaller than a width of the edge sealant.

Optionally, the width of each first sealant is the same as the width of each second sealant.

A method of forming a switchable glass is further provided in the present disclosure, including:

forming a first electrode layer and a first alignment layer sequentially on a first substrate, and forming a second electrode layer and a second alignment layer sequentially on a second substrate;

forming first sealants distributed along a first direction, second sealants distributed along a second direction and an edge sealant at the edge of the first alignment layer on the first alignment layer, where the first sealants and the second sealants form a grid with a plurality of openings;

forming a plurality of liquid crystal layers corresponding to the plurality of openings on the second alignment layer;

oppositely arranging the first substrate and the second substrate to form a cell, and curing the first sealants and the second sealants to form the switchable glass panel; and cutting the switchable glass panel according to a size parameter of the switchable glass to form at least one switchable glass.

Optionally, the method further includes:

cutting the second substrate, the second electrode layer and the second alignment layer in the first area at an edge of the obtained switchable glass to form a first bonding area; and cutting the first substrate, the first electrode layer and the first alignment layer in the second area at the edge of the obtained switchable glass to form a second bonding area.

Optionally, a portion of an edge of the at least one switchable glass obtained by cutting the switchable glass panel coincides with an edge of the first alignment layer.

Optionally, the method further includes:

cutting the second substrate, the second electrode layer and the second alignment layer in the first area at an edge of the obtained switchable glass to form a first bonding area; and cutting the first substrate, the first electrode layer and the first alignment layer in the second area at the edge of the obtained switchable glass to form a second bonding area.

A switchable glass panel is further provided in the present disclosure, including a first substrate and a second substrate, where a first electrode layer and a first alignment layer are sequentially arranged on the first substrate, and a second electrode layer and a second alignment layer are sequentially arranged on the second substrate; the first alignment layer is provided with first sealants distributed along a first direction, second sealants distributed along a second direction and an edge sealant at an edge of the first alignment layer, where the first sealants and the second sealants form a grid with a plurality of openings; the second alignment layer is provided with a plurality of liquid crystal layers corresponding to the plurality of openings.

Optionally, the first sealants are arranged at equal intervals along the first direction, and the second sealants are arranged at equal intervals along the second direction.

Optionally, an interval between adjacent first sealants is equal to an interval between adjacent second sealants.

Optionally, an interval between adjacent first sealants in a central area of the first substrate with a set size is greater than an interval between adjacent first sealants in the other area of the first substrate, and an interval between adjacent second sealants in the central area of the first substrate with the set size is greater than an interval between adjacent second sealants in the other area of the first substrate.

Optionally, the first direction is orthogonal to the second direction.

Optionally, the first substrate has a rectangular shape, and the first direction and the second direction are respectively parallel to two adjacent sides of the rectangular shape.

Optionally, a width of each first sealant and a width of each second sealant are smaller than a width of the edge sealant.

Optionally, the width of each first sealant is the same as the width of each second sealant.

BRIEF DESCRIPTION OF THE DRAWINGS

The following detailed description of the embodiments of the present disclosure is provided with reference to the accompanying drawings.

DETAILED DESCRIPTION

The terms "on • • •", "on • • •" and "disposed on • • •" as used in this disclosure may mean that one layer is formed or disposed directly on another layer, or that one layer is formed or disposed indirectly on another layer, i.e., that there are other layers between the two layers.

It will be understood that, although the terms "first", "second", etc. may be used herein to describe various elements, components, elements, regions, layers and/or sections, these elements, components, elements, regions, layers and/or sections should not be limited by these terms. Rather, these terms are used to distinguish one element, component, element, region, layer or section from another. Thus, for example, a first component, a first member, a first element, a first region, a first layer, and/or a first portion discussed below could be termed a second component, a second member, a second element, a second region, a second layer, and/or a second portion without departing from the teachings of the present disclosure.

In the present disclosure, unless otherwise specified, the term "disposed on the same layer" is used to mean that two layers, components, members, elements or portions may be formed by the same manufacturing process (e.g., patterning process, etc.), and the two layers, components, members, elements or portions are generally formed of the same material. For example, two or more functional layers are arranged in the same layer, which means that the functional layers arranged in the same layer can be formed by using the same material layer and using the same manufacturing process, so that the manufacturing process of the display substrate can be simplified.

In the present disclosure, unless otherwise specified, the expression "patterning process" generally includes the steps of coating of a photoresist, exposure, development, etching, stripping of the photoresist, and the like. The expression "one-time patterning process" means a process of forming a patterned layer, member, component, or the like using one mask.

Figure 1A:
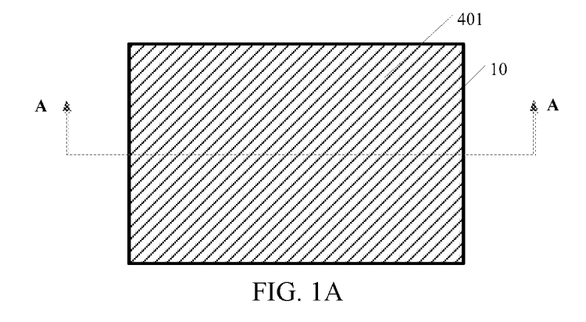
FIG. 1A shows a schematic structural diagram of a switchable glass in the related art.
Figure 1B:
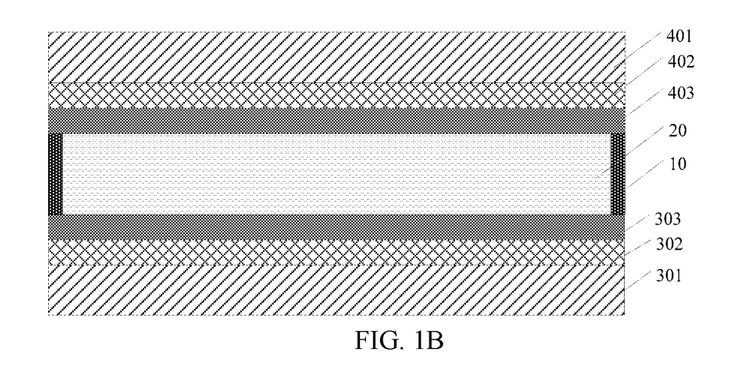
FIG. 1B shows a schematic cross-sectional view along A-A of FIG. 1A.

FIG. 1A shows a schematic structural diagram of a switchable glass in the related art, and FIG. 1B is a schematic sectional diagram along a-a direction in FIG. 1A, as shown in FIG. 1A and FIG. 1B, the switchable glass includes a first substrate 301 and a second substrate 401 oppositely disposed, and further includes the first substrate 301, a first electrode layer 302 on the first substrate 301, and a first alignment layer 303 on the first electrode layer 302, which are formed on the first substrate 301 and are stacked together; a second substrate 401 formed on a side of the second substrate 401 close to the first substrate 301, a second electrode layer 402 positioned on a lower side of the second substrate 401, a second alignment layer 403 positioned on a lower side of the second electrode layer 402, and a liquid crystal layer 20 positioned between the first alignment layer 303 and the second alignment layer 403. Firstly, the edge of the first alignment layer 303 is coated with sealant, liquid crystal is dripped on the second alignment layer 403 at a position surrounded by the sealant coated on the first alignment layer 303 by adopting an One Drop Filling (ODF) technology, and then the box is aligned to prepare the switchable glass. In the process of producing switchable glass with different specifications and different sizes in the related art, the method needs to cut the substrate with the corresponding size in advance, and performs the sealant coating design according to the size and the specification of the substrate obtained by cutting so as to prepare the switchable glass with different specifications and different sizes.

Figure 2:
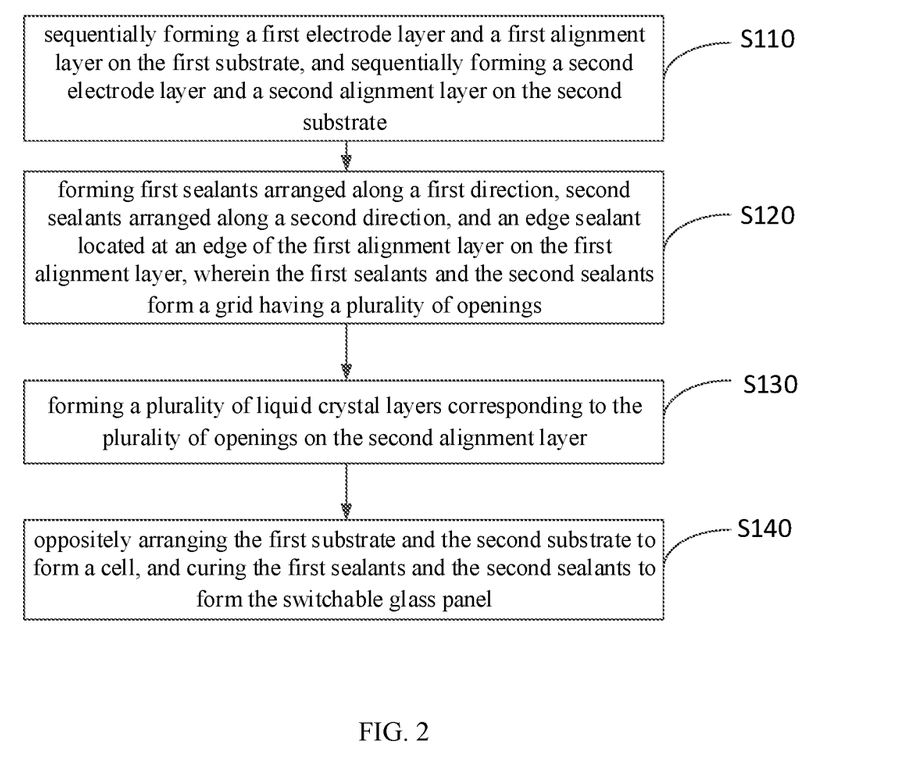
FIG. 2 shows a flowchart of a method of forming a switchable glass panel according to an embodiment of the present disclosure.

In view of this, an embodiment of the present disclosure provides a method of forming a switchable glass panel, as shown in FIG. 2, including:

S110: sequentially forming a first electrode layer and a first alignment layer on the first substrate, and sequentially forming a second electrode layer and a second alignment layer on the second substrate.

In a specific example, the first substrate and the second substrate may be flexible substrates, glass substrates, quartz substrates, or the like, and different materials are selected according to a specific application scenario of the switchable glass. In another specific example, the material of the first electrode layer and the second electrode layer may be indium tin oxide, carbon nanotubes, or aluminum-doped zinc oxide. In yet another specific example, the material of the first alignment layer and the second alignment layer may be a mixture of polyimide, N-methylpyrrolidone, and ethylene glycol butyl ether, or a polymer of hydroxyethyl acrylate, 3-isocyanatomethylene-3, 5, 5-trimethylcyclohexyl isocyanate, bisphenolylpropane, and 1, 4-cyclohexanediol.

In a specific example, for example, glass substrates are used as the first substrate and the second substrate, Indium Tin Oxide (ITO) is used as the first electrode layer and the second electrode layer, and an Indium tin oxide electrode layer, that is, an ITO electrode layer, which is an N-type oxide semiconductor transparent conductive film, may be formed by performing a sputtering process or physical vapor deposition on the inner side of the glass substrates.

S120: forming first sealants arranged along a first direction, second sealants arranged along a second direction, and an edge sealant located at an edge of the first alignment layer on the first alignment layer, wherein the first sealants and the second sealants form a grid having a plurality of openings.

It should be noted that, sealant materials with different properties can be selected according to different application scenes of the switchable glass, in a specific example, the application scenes of the switchable glass are biased to meet the requirement of a bright state, for example, if the performance requirements of a shop window, a smart window and the like on the sealant materials are high in transmittance, the sealant is selected from materials with high transmittance; the application scene of the light-adjusting glass is biased to the dark state requirement, such as vehicle-mounted glass, architectural sun-shading films and the like, and the performance requirement on the sealant material is lower transmittance, so that the sealant is made of a material with lower transmittance.

Figure 3:
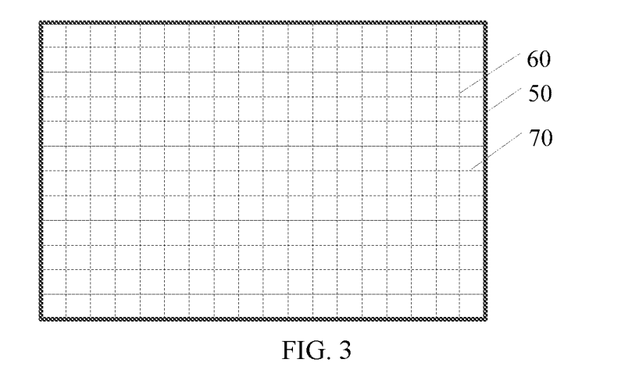
FIG. 3 shows a schematic structural diagram of a switchable glass panel according to an embodiment of the present disclosure.

In a specific example, in the process of forming the switchable glass panel, not only the edge sealant 50 is coated on the edge of the first alignment layer of the first substrate, but also a plurality of first sealant 60 arranged along the first direction and a plurality of second sealant 70 arranged along the second direction are coated on the first alignment layer, and the first sealant 60 and the second sealant 70 intersect to form a grid with a plurality of openings for accommodating the liquid crystal layer, as shown in FIG. 3. It is understood that, in another specific example, the first direction may be an oblique line direction from a lower left to an upper right, and the second direction may be an oblique line direction from a lower right to an upper left, which is not further limited in the present embodiment.

In an embodiment of the present disclosure, the first direction is orthogonal to the second direction.

In a specific example, the extending direction of the first sealant 60 is a vertical direction, and the extending direction of the second sealant 70 is a horizontal direction, at this time, the extending direction of the first sealant 60 is orthogonal to the extending direction of the second sealant 70, and by arranging the first sealant and the second sealant which are orthogonal, it is ensured that the liquid crystal can be diffused to the edge of a space enclosed by the first sealant and the second sealant, particularly four corners, full filling of the liquid crystal is ensured, uniform distribution of the liquid crystal layer is ensured, the yield and the display effect of the switchable glass panel are ensured, meanwhile, the speed of coating the first sealant and the second sealant can be increased, the production efficiency of the switchable glass panel is improved, and the switchable glass panel can be cut at will to obtain the switchable glass with different sizes and different specifications. For example, the first substrate is rectangular, and the first direction and the second direction are respectively parallel to two adjacent sides of the rectangle.

In a specific example, as shown in FIG. 3, the edge sealant 50 of the switchable glass display panel is rectangular, the direction of the first sealant 60 is parallel to the long sides of the rectangle (i.e., the upper side and the lower side shown in FIG. 3), and the direction of the second sealant 70 is parallel to the short sides of the rectangle (i.e., the left side and the right side shown in FIG. 3), or the direction of the first sealant 60 is parallel to the short sides of the first substrate (i.e., the left side and the right side shown in FIG. 3), and the direction of the second sealant 70 is parallel to the long sides of the first substrate (i.e., the upper side and the lower side shown in FIG. 3).

For example, the first sealants are arranged at equal intervals along the first direction, and the second sealants are arranged at equal intervals along the second direction.

In a specific example, in FIG. 3, the first sealants 60 are spaced apart at equal intervals, and the second sealants 70 are spaced apart at equal intervals, so as to ensure that the sizes of the openings enclosed between the first sealant 60 and the second sealant 70 are the same, thereby facilitating the subsequent formation of a liquid crystal layer corresponding to the openings, ensuring that the liquid crystal layer corresponding to the openings is filled, and preventing bubbles from being generated in the liquid crystal layer; the width and the length of the liquid crystal layer can be ensured to be consistent, the display effect of each light-emitting unit is ensured to be the same, and the integral display image quality of the switchable glass is further improved.

In addition, it should be noted that the size of the grid formed by the first sealant 60 and the second sealant 70 may be determined according to the property of the liquid crystal material and the coating process capability, and the size of the grid formed by the first sealant 60 and the second sealant 70 and the width of the first sealant 60 and the second sealant 70 are combined to be adjusted mutually, so as to avoid the poor process conditions such as liquid crystal puncture, liquid crystal underfill, and bubble generation in the box after the box.

For example, the space between the adjacent first sealants 60 is equal to the space between the adjacent second sealants 70.

In a specific example, the size of the plurality of openings formed by the first sealant 60 and the second sealant 70 is designed to be a×b mm, and in an example where the interval between the adjacent first sealant 60 is equal to the interval between the adjacent second sealant 70, that is, a=b, that is, the openings formed by the first sealant 60 and the second sealant 70 are rectangular, so that a liquid crystal layer corresponding to the openings is formed quickly, the liquid crystal layer is filled after the box is sealed, the speed of coating the first sealant and the second sealant is increased, the production efficiency of the light-adjusting glass panel is improved, and the light-adjusting glass panel is favorably cut at will to obtain light-adjusting glasses with different specifications and sizes. In an example, the opening size is designed to be 18×18 mm; in another specific example, the opening size may be designed to be 100×100 mm. Of these, 18×18 and 100×100 mm are only examples, and the size of the opening is not further limited in this example.

For example, the width of the first sealant 60 and the width of the second sealant 70 are respectively smaller than the width of the edge sealant 50.

It can be understood that, in the box-sealing process, the liquid crystal is extruded and quickly diffused in the space surrounded by the frame-sealing glue, so that the uncured or incompletely cured frame-sealing glue may be impacted by the liquid crystal. The vacuum environment in the switchable glass panel enables the switchable glass panel and the sealant to be oppositely extruded, and the impact of the liquid crystal on the sealant is intensified. The phenomenon that the liquid crystal impacts the sealant is called liquid crystal puncture for short. This may cause deformation or fracture of the frame sealant, decrease in the adhesive strength of the frame sealant, contamination of the liquid crystal by the frame sealant, and the like, and may even affect the service life of the light-adjusting glass display panel in case of serious damage. In one embodiment, the width of the first sealant 60 and the width of the second sealant 70 are less than the width of the edge sealant 50, and in one embodiment, the width of the first sealant 60 and the width of the second sealant 70 may be 0.5 to 3.5 mm, and the width of the edge sealant may be 3.5 mm. It can be understood that the width of the first sealant 60 and the width of the second sealant 70 may be any value from 0.5 mm to 3.5 mm, and may be determined according to actual working requirements and process equipment conditions. The present disclosure does not limit the thickness of the first sealant, the second sealant and the edge sealant. The example can effectively prevent the light-adjusting glass panel from being scrapped due to the fact that the liquid crystal punctures the edge sealant, and the reliability of the light-adjusting glass panel is effectively improved; and the method is adaptive to the preparation process of the related technology, has good compatibility and can improve the production efficiency of the switchable glass panel.

For example, the width of the first sealant 60 is the same as the width of the second sealant 70.

It should be noted that the width of the first sealant 60 and the width of the second sealant 70 are limited by the sealant coating process capability, the box capability of the liquid crystal dropping and the tape glue cutting capability, and when the sealant width is designed, it is ensured that the glue breaking and the sealant width are not consistent during coating, the liquid crystal puncture, the liquid crystal filling and the bubble generation in the box cannot occur during the box aligning, and the situation of liquid crystal leakage caused by too low cutting precision and the like cannot occur during cutting, so the sealant width design needs to be matched with the corresponding process equipment capability.

According to the implementation mode, the first sealant 60 and the second sealant 70 which are the same in width are arranged, so that process adverse conditions such as liquid crystal puncture, liquid crystal filling failure and bubbles in the box can be effectively prevented, and the reliability of the switchable glass panel is ensured. Meanwhile, the speed of coating the sealant can be increased, the rapid production of the switchable glass panel is facilitated, and the switchable glass panel can be cut randomly to obtain the switchable glass with multiple sizes.

S130: forming a plurality of liquid crystal layers corresponding to the plurality of openings on the second alignment layer.

In an example, a plurality of liquid crystal layers are disposed on the second alignment layer 403 of the second substrate 401 corresponding to the first substrate 301, wherein the liquid crystal layers correspond to the grid with a plurality of openings formed by the first sealant 60 and the second sealant 70 of the first alignment layer 303 of the first substrate 301.

S140: oppositely arranging the first substrate and the second substrate to form a cell, and curing the first sealants and the second sealants to form the switchable glass panel.

In an example, the first substrate 301 and the second substrate 401 are arranged oppositely to form a cell, a plurality of liquid crystal layers are filled in a grid with a plurality of openings formed by the first sealant 60 and the second sealant 70, and the sealant 50 is cured to obtain the switchable glass panel. In one embodiment, the sealant 50 can be cured quickly in a short time by ultraviolet irradiation with a proper power to prevent liquid crystal from puncturing and causing contamination.

According to the embodiment, the first sealant, the second sealant and the edge sealant are arranged, so that the sealant forms a gridding design on the substrate, a liquid crystal layer can be coated on the sealant in the switchable glass obtained by randomly cutting the switchable glass panel, namely, the switchable glass panel can be cut according to the specification and the size of actual needs, and various switchable glasses with different specifications and sizes can be obtained, so that the production efficiency of the switchable glass with different specifications and different sizes can be improved, and the problems that in the related technology, the debugging time is too long, the production line equipment occupies seriously, the demands of workers are more, the time consumption is long, the production efficiency is low and the like when various switchable glasses with different sizes and different specifications are produced at the same time are solved; in addition, after the cutting of the switchable glass is completed, the rest switchable glass panel can be used as small-size switchable glass or a sample for reliability test, and the overall utilization rate of the switchable glass panel can be effectively improved.

In an embodiment of the present disclosure, an interval between adjacent first sealants in a central area of the first substrate with a set size is greater than an interval between adjacent first sealants in the other area of the first substrate, and an interval between adjacent second sealants in the central area of the first substrate with the set size is greater than an interval between adjacent second sealants in the other area of the first substrate.

Figure 4:
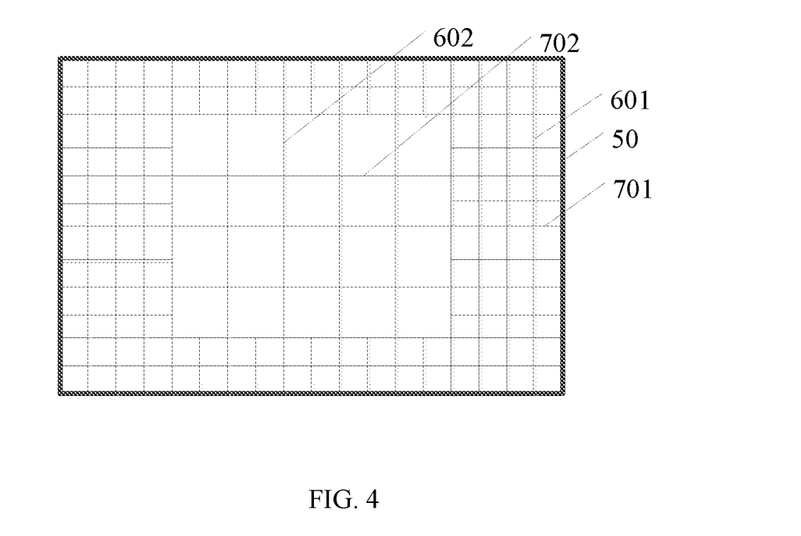
FIG. 4 shows a schematic structural diagram of a switchable glass panel according to another embodiment of the present disclosure.
Figure 5:
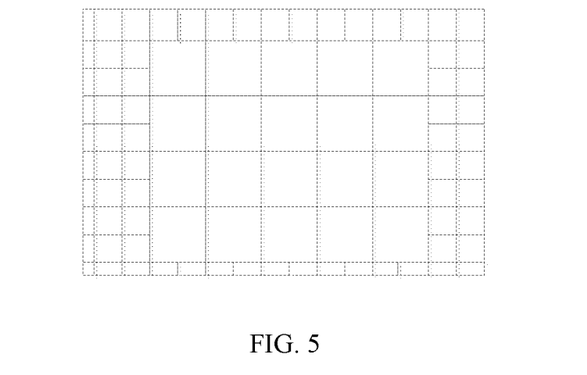
FIG. 5 illustrates a switchable glass in an embodiment of the present disclosure.

In a specific example, as shown in FIG. 4, the above-described mesh is designed as a main mesh region set as a central region of a set size of the first substrate 301 and a sub-mesh region set as a peripheral region, which is the other region of the first substrate 301 except for the central region. The mesh size of the main mesh region is designed to be larger than the mesh size of the auxiliary mesh region, specifically, an interval between adjacent first sealant 602 of the main mesh region is larger than an interval between adjacent first sealant 601 of the other regions, an interval between adjacent second sealant 702 of the main mesh region is larger than an interval between adjacent second sealant 701 of the other regions, for example, an opening size of the main mesh region is designed to be 100 mm, that is, an interval between adjacent first sealant 602 of the main mesh region and an interval between adjacent second sealant 702 are both 100 mm, and an opening size of the auxiliary mesh region is designed to be 18×18 mm, that is, an interval between adjacent first sealant 601 of the auxiliary mesh region and an interval between adjacent second sealant 701 are both 18 mm. When the switchable glass panel of the specific example corresponds to irregular switchable glass, the peripheral cutting can better meet the actual size requirement, the switchable glass obtained by cutting the switchable glass panel according to FIG. 4 is shown in FIG. 5, the size of the opening in the central area of the switchable glass shown in FIG. 5 is larger, namely, more liquid crystal layers are filled in the central area, the distribution is more uniform, on the basis that the switchable glass panel meets the requirement that the switchable glass with different specifications and sizes can be obtained by cutting at will, the dimming effect of the central area of the switchable glass is better, and the display effect of the switchable glass containing the central area is effectively improved. Meanwhile, the bonding area of the switchable glass as shown in FIG. 5 may share a partial area of the cut mesh edge.

Another embodiment of the present disclosure provides a switchable glass panel, which includes a first substrate 301 and a second substrate 401 of a pair box, wherein a first electrode layer 302 and a first alignment layer 303 are sequentially disposed on the first substrate 301, and a second electrode layer 402 and a second alignment layer 403 are sequentially disposed on the second substrate 401; the first alignment layer 303 is provided with a first sealant 60 distributed along a first direction, a second sealant 70 distributed along a second direction and an edge sealant 50 at the edge of the first alignment layer 303, wherein the first sealant 60 and the second sealant 70 form a grid with a plurality of openings; a plurality of liquid crystal layers corresponding to the plurality of openings are disposed on the second alignment layer 403.

Optionally, the first sealants are arranged at equal intervals along the first direction, and the second sealants are arranged at equal intervals along the second direction.

Optionally, an interval between adjacent first sealants is equal to an interval between adjacent second sealants.

Optionally, an interval between adjacent first sealants in a central area of the first substrate with a set size is greater than an interval between adjacent first sealants in the other area of the first substrate, and an interval between adjacent second sealants in the central area of the first substrate with the set size is greater than an interval between adjacent second sealants in the other area of the first substrate.

Optionally, the first direction is orthogonal to the second direction.

Optionally, the first substrate has a rectangular shape, and the first direction and the second direction are respectively parallel to two adjacent sides of the rectangular shape.

Optionally, a width of each first sealant and a width of each second sealant are smaller than a width of the edge sealant.

Optionally, the width of each first sealant is the same as the width of each second sealant.

It should be noted that the switchable glass panel provided in this embodiment can be prepared by the method provided in the foregoing embodiment, and the structures such as the sealant and the like thereof can refer to the description of the foregoing embodiment, and are not repeated herein.

Figure 6:
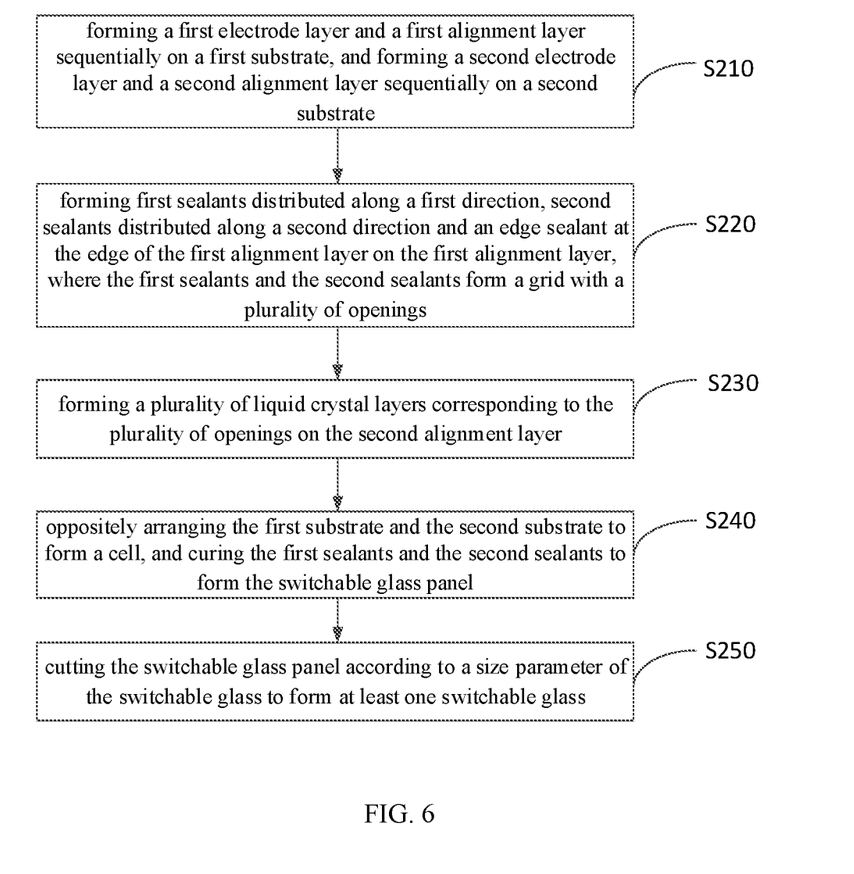
FIG. 6 shows a flowchart of a method of forming a switchable glass according to another embodiment of the present disclosure.

To solve the technical issues in the related art, the invention provides a switchable glass panel, which is characterized in that a first sealant, a second sealant and an edge sealant are arranged, so that the sealants form a gridding design on a substrate to ensure that the sealants in the switchable glass obtained by randomly cutting the switchable glass panel can cover a liquid crystal layer, namely, the switchable glass panel can be cut according to the specification and the size of actual needs to obtain multiple kinds of switchable glass with different specifications and different sizes, thereby improving the production efficiency of the switchable glass with different specifications and different sizes, and solving the problems of overlong debugging time, serious occupation of production line equipment, more demands of workers, long time consumption, low production efficiency and the like easily caused when the switchable glass with different sizes and different specifications is produced simultaneously in the prior art; in addition, after the cutting of the switchable glass is finished, the rest switchable glass panel can be used as small-size switchable glass or a sample for reliability test, and the overall utilization rate of the switchable glass panel can be effectively improved Another embodiment of the present disclosure provides a method of forming a switchable glass, as shown in FIG. 6, including:

S210: forming a first electrode layer and a first alignment layer sequentially on a first substrate, and forming a second electrode layer and a second alignment layer sequentially on a second substrate;

S220: forming first sealants distributed along a first direction, second sealants distributed along a second direction and an edge sealant at the edge of the first alignment layer on the first alignment layer, where the first sealants and the second sealants form a grid with a plurality of openings;

S230: forming a plurality of liquid crystal layers corresponding to the plurality of openings on the second alignment layer;

S240: oppositely arranging the first substrate and the second substrate to form a cell, and curing the first sealants and the second sealants to form the switchable glass panel; and S250: cutting the switchable glass panel according to a size parameter of the switchable glass to form at least one switchable glass.

It should be understood by those skilled in the art that, although the above steps are described in the order of S110-S140 and S210-S210, it is not meant to be necessarily performed in this order, for example, S130 and S120 may be performed first, i.e., the liquid crystal layer is formed first, and then the first sealant, the second sealant and the edge sealant are formed corresponding to the liquid crystal layer.

Figure 7A:
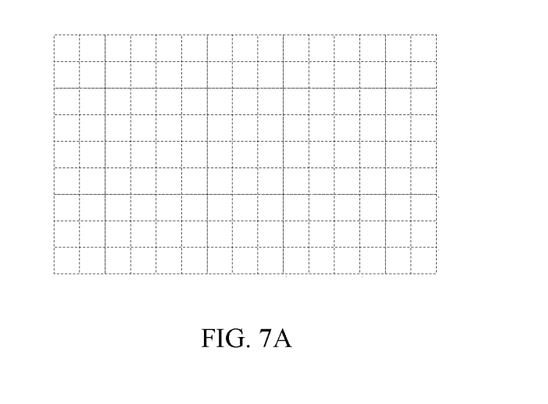
FIG. 7A-7D show schematic structural views of different sizes of switchable glasses in various implementations of the present disclosure.
Figure 7B:
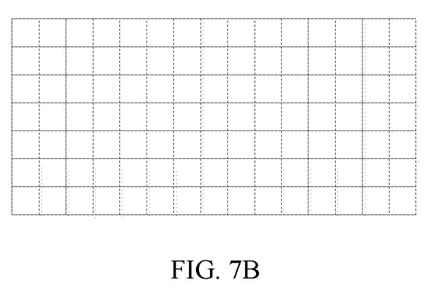
Figures 7C, 7D:
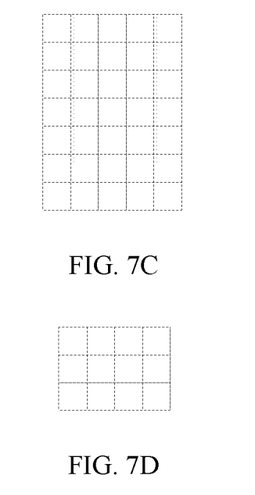

It should be noted that the method of the switchable glass provided in this embodiment is similar to the method of the switchable glass panel, and reference may be made to the above description for relevant parts, which are not described herein again. In an example, the switchable glass panel is cut according to the size parameters of the switchable glass as shown in FIGS. 7A, 7B, 7C and 7D (wherein the size parameters may include the size of the area where the first bonding region and the second bonding region are formed). Since the size of the switchable glass shown in FIGS. 7A and 7B is large, one switchable glass as shown in FIGS. 7A and 7B is cut from one switchable glass panel, but the rest of the panels can be used to cut switchable glass with smaller size as shown in FIGS. 7C and 7D, and when the size of the switchable glass to be cut is small as shown in FIGS. 7C and 7D, a plurality of switchable glasses as shown in FIGS. 7C and 7D can be cut from one switchable glass panel, and the specific number of cut pieces depends on the size of the switchable glass panel and the required switchable glass.

Figure 8A:
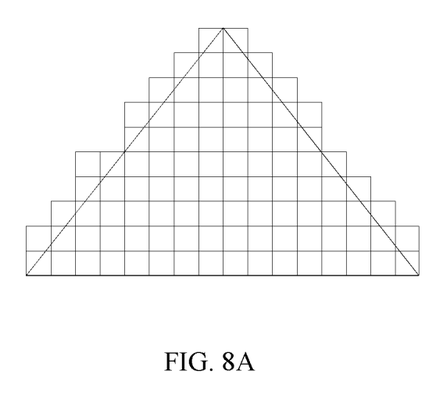
FIG. 8A-8B illustrate schematic structural diagrams of shaped switchable glasses of different specifications and sizes provided in different implementations of the present disclosure.
Figure 8B:
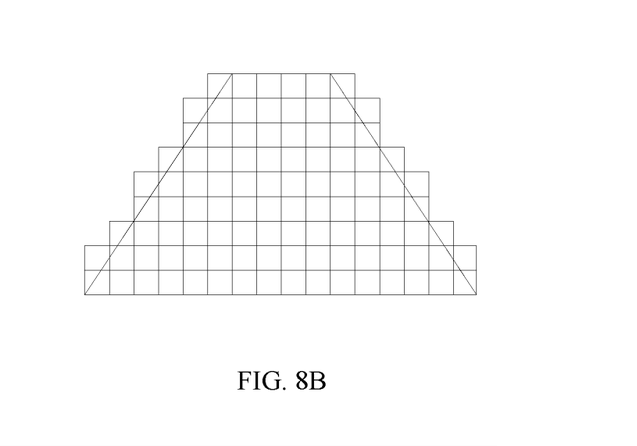

In this example, the cutting of the shaped switchable glass is also applicable to the cutting of the rectangular switchable glass, for example, the shaped switchable glass with different specifications and different sizes, such as the triangle shown in FIG. 8A and the trapezoid shown in FIG. 8B, can be cut from the switchable glass panel obtained as above. It should be noted that although in FIGS. 8A and 8B, the oblique edge (i.e., the irregular edge) has a more obvious grid saw-tooth shape, in practice, since the size of the switchable glass obtained by cutting is much larger than the size of the openings of the grid formed by the first sealant and the second sealant, the grid saw-tooth shape of the oblique edge (i.e., the irregular edge) is not obvious in practice and is sealed in the frame.

Figure 9:
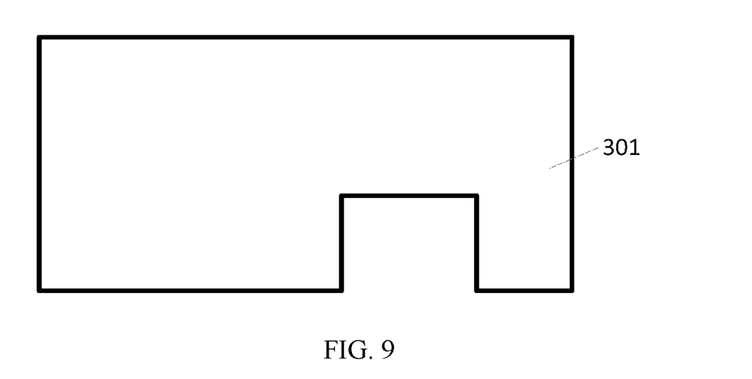
FIG. 9 is a schematic structural view illustrating a first substrate of a switchable glass according to an embodiment of the present disclosure.
Figure 10:
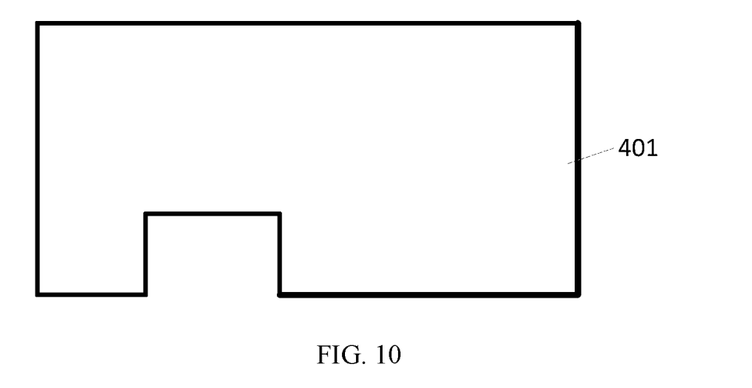
FIG. 10 is a schematic view illustrating a structure of a second substrate of the switchable glass according to an embodiment of the present disclosure.
Figure 11:
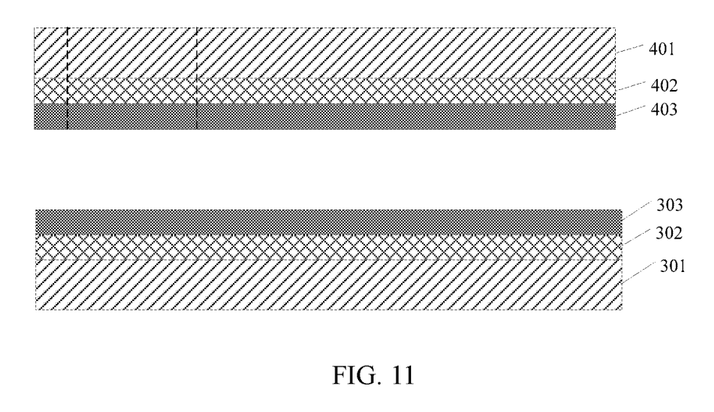
FIG. 11 illustrates a cross-sectional view of a switchable glass of one embodiment of the present disclosure.

In an embodiment of the present disclosure, the method further includes:

cutting the second substrate 401, the second electrode layer 402 and the second alignment layer 403 in the first region of the edge of the obtained switchable glass to form a first bonding area for the first electrode layer 302; the first substrate 301, the first electrode layer 302, and the first alignment layer 303 of the second region of the edge of the obtained switchable glass are cut to form a second bonding region for the second electrode layer 402. The first bonding region is used for connecting the first electrode layer 302 of the first region and an external circuit; the second bonding area is used to connect the second electrode layer 402 of the second area with an external circuit. In an example, the first region and the second region may be located on the same side of the switchable glass, for example, the first bonding region and the second bonding region are respectively located at the upper end and the lower end of the same side of the switchable glass.

Specifically, after the box alignment is completed, the second substrate 401, the second electrode layer 402 and the second alignment layer 403 in the first region of the edge of the switchable glass are cut to form a first bonding area; the first substrate 301, the first electrode layer 302 and the first alignment layer 303 of the second region of the edge of the switchable glass are cut to form a second bonding region, as shown in FIGS. 9 to 11, where FIG. 11 is a schematic diagram of the first bonding region for the first electrode layer 302 formed by cutting the second substrate 401, the second electrode layer 402 and the second alignment layer 403 of the first region of the edge of the switchable glass.

In an embodiment of the present disclosure, the partial edge of the at least one piece of switchable glass obtained by cutting the switchable glass panel coincides with the edge of the first alignment layer 303.

Specifically, at least one side of the switchable glass obtained by cutting the switchable glass panel is at least part of the side of the switchable glass panel, that is, the switchable glass panel is cut at the edge, and at least one side of the switchable glass panel is used as the side of the switchable glass. In one possible implementation, the method further includes:

the second substrate 401, the second electrode layer 402 and the second alignment layer 403 of the first region of the edge of the cut switchable glass form a first bonding region for the first electrode layer 302; the first substrate 301, the first electrode layer 302, and the first alignment layer 303 of the second region of the edge of the cut portion of the switchable glass form a second bonding region for the second electrode layer 402.

Specifically, a part of the edge of the switchable glass coincides with the edge of the first alignment layer 303, that is, a part of the edge of the switchable glass coincides with the edge of the switchable glass panel, that is, a first bonding region and a second bonding region are respectively formed in a first region and a second region of the part of the edge of the switchable glass, that is, the first bonding region and the second bonding region are disposed at the edge of the switchable glass panel (outside the mesh of the switchable glass panel). Therefore, when the first bonding area and the second bonding area are located on the inner side, the situation that the liquid crystal leakage pollutes the first bonding area and/or the second bonding area due to the fact that the possibly-appearing cutting line is located between the adjacent sealant can be avoided. In a specific example, the first region and the second region may be located on the same side of the switchable glass, that is, the first bonding region and the second bonding region may be located on the same side of the switchable glass, which simplifies the manufacturing process of the bonding regions.

It should be understood that the above-described embodiments of the present disclosure are merely examples for clearly illustrating the disclosure and are not intended to limit the embodiments of the disclosure, and that those skilled in the art, on the basis of the above description, may make other variations or modifications, which are not exhaustive of all embodiments, and obvious variations or modifications of the embodiments disclosed are within the scope of the disclosure.

What is claimed is:

1. A method of forming a switchable glass panel, comprising:

forming a first electrode layer and a first alignment layer sequentially on a first substrate, and forming a second electrode layer and a second alignment layer sequentially on a second substrate;

forming first sealants distributed along a first direction, second sealants distributed along a second direction and an edge sealant at the edge of the first alignment layer on the first alignment layer, wherein the first sealants and the second sealants form a grid with a plurality of openings;

forming a plurality of liquid crystal layers corresponding to the plurality of openings on the second alignment layer; and oppositely arranging the first substrate and the second substrate to form a cell, and curing the first sealants and the second sealants to form the switchable glass panel, wherein an interval between adjacent first sealants in a central area of the first substrate with a set size is greater than an interval between adjacent first sealants in the other area of the first substrate, and an interval between adjacent second sealants in the central area of the first substrate with the set size is greater than an interval between adjacent second sealants in the other area of the first substrate.

2. The method according to claim 1, wherein the first sealants are arranged at equal intervals along the first direction, and the second sealants are arranged at equal intervals along the second direction.

3. The method according to claim 2, wherein an interval between adjacent first sealants is equal to an interval between adjacent second sealants.

4. The method according to claim 1, wherein the first direction is orthogonal to the second direction.

5. The method according to claim 4, wherein the first substrate has a rectangular shape, and the first direction and the second direction are respectively parallel to two adjacent sides of the rectangular shape.

6. The method according to claim 1, wherein a width of each first sealant and a width of each second sealant are smaller than a width of the edge sealant.

7. The method according to claim 6, wherein the width of each first sealant is the same as the width of each second sealant.

8. A method of forming a switchable glass, comprising:
   forming a first electrode layer and a first alignment layer sequentially on a first substrate, and forming a second electrode layer and a second alignment layer sequentially on a second substrate;
   forming first sealants distributed along a first direction, second sealants distributed along a second direction and an edge sealant at the edge of the first alignment layer on the first alignment layer, wherein the first sealants and the second sealants form a grid with a plurality of openings;
   forming a plurality of liquid crystal layers corresponding to the plurality of openings on the second alignment layer;
   oppositely arranging the first substrate and the second substrate to form a cell, and curing the first sealants and the second sealants to form the switchable glass panel; and
   cutting the switchable glass panel according to a size parameter of the switchable glass to form at least one switchable glass,
   wherein an interval between adjacent first sealants in a central area of the first substrate with a set size is greater than an interval between adjacent first sealants in the other area of the first substrate, and an interval between adjacent second sealants in the central area of the first substrate with the set size is greater than an interval between adjacent second sealants in the other area of the first substrate.

9. The method according to claim 8, further comprising:
   cutting the second substrate, the second electrode layer and the second alignment layer in the first area at an edge of the obtained switchable glass to form a first bonding area; and cutting the first substrate, the first electrode layer and the first alignment layer in the second area at the edge of the obtained switchable glass to form a second bonding area.

10. The method according to claim 8, wherein a portion of an edge of the at least one switchable glass obtained by cutting the switchable glass panel coincides with an edge of the first alignment layer.

11. The method according to claim 10, further comprising:
    cutting the second substrate, the second electrode layer and the second alignment layer in the first area at an edge of the obtained switchable glass to form a first bonding area; and
    cutting the first substrate, the first electrode layer and the first alignment layer in the second area at the edge of the obtained switchable glass to form a second bonding area.

12. A switchable glass panel, comprising a first substrate and a second substrate, wherein a first electrode layer and a first alignment layer are sequentially arranged on the first substrate, and a second electrode layer and a second alignment layer are sequentially arranged on the second substrate; the first alignment layer is provided with first sealants distributed along a first direction, second sealants distributed along a second direction and an edge sealant at an edge of the first alignment layer, wherein the first sealants and the second sealants form a grid with a plurality of openings; the second alignment layer is provided with a plurality of liquid crystal layers corresponding to the plurality of openings,
    wherein an interval between adjacent first sealants in a central area of the first substrate with a set size is greater than an interval between adjacent first sealants in the other area of the first substrate, and an interval between adjacent second sealants in the central area of the first substrate with the set size is greater than an interval between adjacent second sealants in the other area of the first substrate.

13. The switchable glass panel according to claim 12, wherein the first sealants are arranged at equal intervals along the first direction, and the second sealants are arranged at equal intervals along the second direction.

14. The switchable glass panel according to claim 13, wherein an interval between adjacent first sealants is equal to an interval between adjacent second sealants.

15. The switchable glass panel according to claim 12, wherein the first direction is orthogonal to the second direction.

16. The switchable glass panel according to claim 15, wherein the first substrate has a rectangular shape, and the first direction and the second direction are respectively parallel to two adjacent sides of the rectangular shape.

17. The switchable glass panel according to claim 12, wherein a width of each first sealant and a width of each second sealant are smaller than a width of the edge sealant.

18. The switchable glass panel according to claim 17, wherein the width of each first sealant is the same as the width of each second sealant.

* * * * *